C. MACBETH AND W. H. PAULL.
WHEEL OF VEHICLES, PARTICULARLY AIRCRAFT.
APPLICATION FILED JUNE 9, 1919.

1,326,679.

Patented Dec. 30, 1919.

C. MACBETH AND W. H. PAULL.
WHEEL OF VEHICLES, PARTICULARLY AIRCRAFT.
APPLICATION FILED JUNE 9, 1919.
1,326,679.
Patented Dec. 30, 1919.
2 SHEETS—SHEET 2.
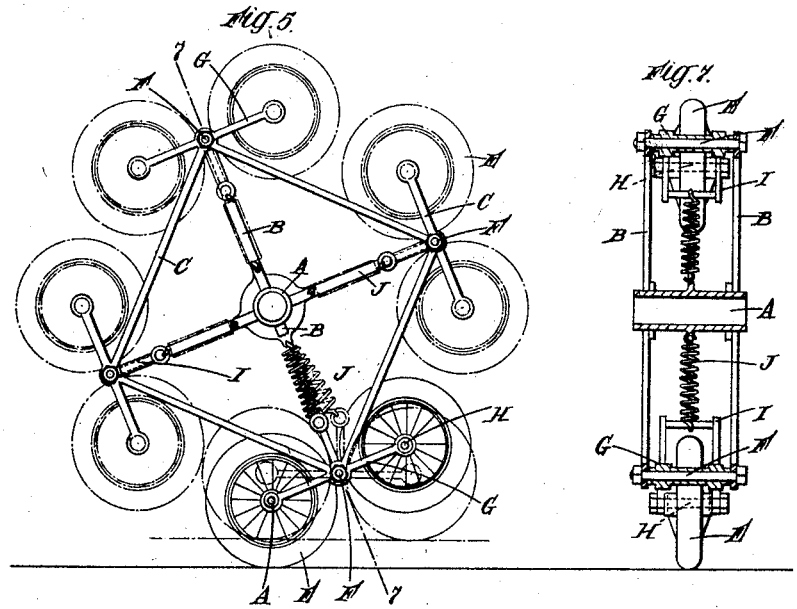
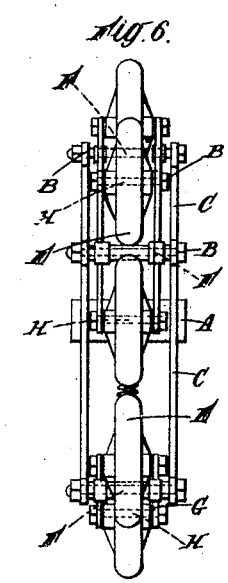

UNITED STATES PATENT OFFICE.

COLIN MACBETH AND WALLACE HENRY PAULL, OF BIRMINGHAM, ENGLAND, ASSIGNORS TO THE DUNLOP RUBBER COMPANY, LIMITED, OF WESTMINSTER, LONDON, ENGLAND.

WHEEL OF VEHICLES, PARTICULARLY AIRCRAFT.

1,326,679.  Specification of Letters Patent.  Patented Dec. 30, 1919.

Application filed June 9, 1919. Serial No. 302,919.

*To all whom it may concern:*

Be it known that we, COLIN MACBETH and WALLACE HENRY PAULL, both subjects of the King of Great Britain, residing at Para Mills, Aston Cross, Birmingham, in the county of Warwick, England, have invented certain new and useful Improvements in or Relating to Wheels of Vehicles, Particularly Aircraft, of which the following is a specification.

This invention relates to wheels for vehicles, particularly aircraft. Some aircraft wheels are provided with pneumatic tires which are so large as to be difficult to manufacture on a commercial scale. The chief object of the present invention is to avoid the necessity of using large tires, and to provide an improved wheel and tire which will not be rendered entirely useless in the case of a puncture and which will effectively support the load under all conditions.

According to this invention, we provide around the wheel so as to form tire or tread, a number of light spoked or disk wheels, each of which is provided with a tire, preferably an inflatable or small pneumatic tire. The said tired wheels may be arranged in one or more vertical planes or circumferential rows, and they may be disposed in staggered formation. We may so mount the said tired wheels that no single one of them will at any time support the whole load which may therefore be properly distributed over the desired number of the said wheels. For this purpose, frames carrying two or more of the wheels are articulated, in such a manner that when one of the wheels in each frame bears on the ground, the frame will be moved to bring its other wheel or wheels into contact with the ground.

In order that the said invention may be clearly understood and readily carried into effect, the same will now be described more fully with reference to the accompanying diagrammatic drawings, in which:—

Figs. 5 and 6 are respectively a side view (a portion of one spoke being broken away) and a front view of one construction in which the tired wheels are mounted in movable frames.

Fig. 7 is a sectional view taken approximately on the line 7—7 of Fig. 5.

Figure 1:
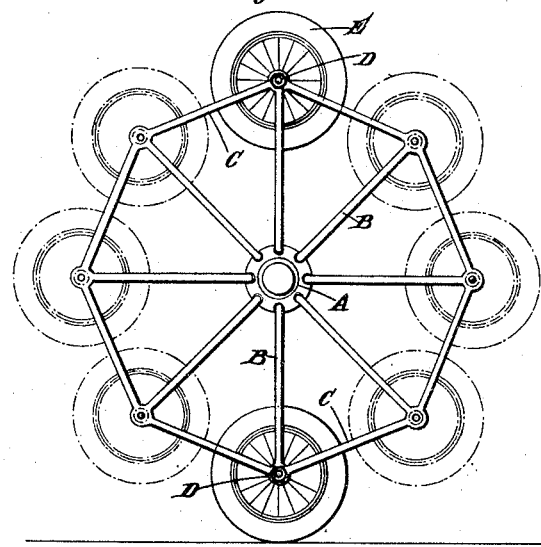
Figure 1 is a side view of one construction of the improved wheel.
Figure 2:
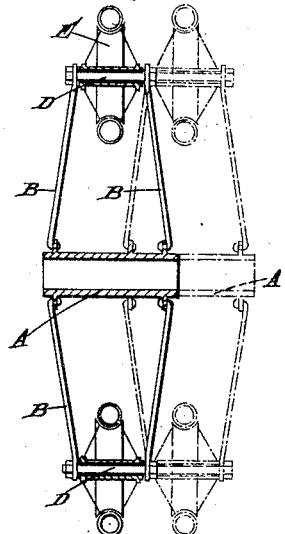
Fig. 2 is a vertical section of the wheel illustrated in Fig. 1 showing by dotted lines, an arrangement of twin wheels.
Figure 3:
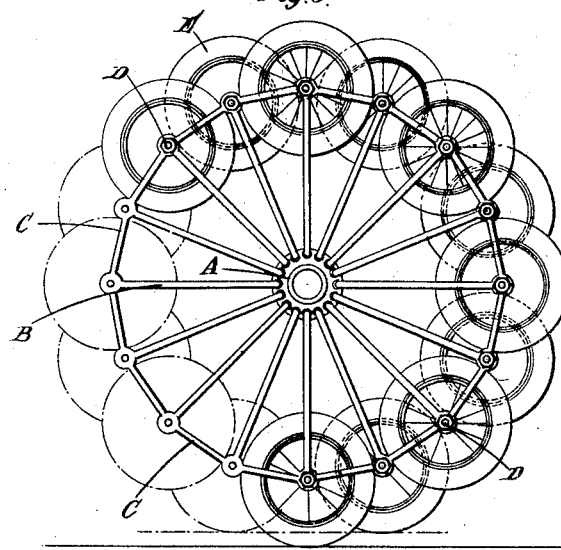
Figs. 3 and 4 are respectively a side view and an end or front view of a modified construction of the improved wheel.
Figure 4:
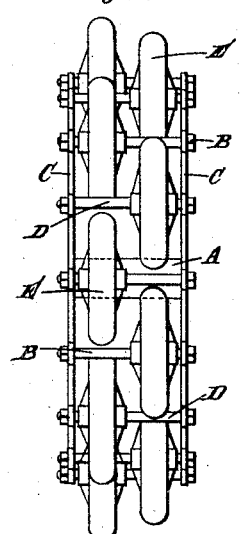

A represents the wheel hub, and B, B represent radial spoke members extending from the outer ends of the hub toward each other, the extremities of the spokes being connected by members C, which constitute a kind of rim or periphery for each set of spoke members. The extremities of the adjacent or corresponding spokes of each set are formed to receive axles or supports D between them, on which small wire spoke or light disk wheels E each carrying a pneumatic tire in any usual or suitable manner, are rotatably mounted, and which as shown in Fig. 1, may be disposed in the same vertical plane, the small wheels being of such size as to lie in close proximity, and thus constitute a composite tire or tread for the wheel. The various wheels E preferably rotate independently of each other, although in some cases they may be geared together or otherwise arranged to rotate simultaneously. If desired, two or more sets of wheels E may be arranged between the spoke members B, or as shown by the dotted lines in Fig. 2, two wheels, each carrying a set of the small wheels E may be arranged side by side on a common hub A. Figs. 3 and 4 show a construction which is generally similar to that described in Figs. 1 and 2, and in which two sets of wheels E are mounted between the sets of spokes B, each of these wheels being mounted on its own axle or support D, and so arranged that the wheels of one circumferential row are staggered relatively to the wheels of the other row. The said wheels E can be readily removed and replaced individually in the case of a puncture, or for any other reason without disturbing the other wheels E.

In the modification illustrated in Figs. 5, 6 and 7, the wheel comprises two sets of spoke members, each containing four radial spoke members B, the extremities of which are connected together by suitable members C so as to form a kind of square frame. At the extremities of the radial spoke members B, axles or supports F are secured in any suitable manner, each axle or support carrying a frame G centrally mounted on the support F, and carrying at its two ends, axles or supports H for two small tired wheels E. Each frame G is provided at its middle part with an extension I at right angles to the frame, and connected by a spring J to the hub A. The springs J normally maintain the frames in a position at right angles to the spokes to which they are connected, but when a wheel E touches the ground, the frame carrying that wheel is rocked about its support F so as to bring the other wheel of that frame into contact with the ground, so that the two wheels support the load. This applies, in the case of an aeroplane, when at rest, when landing or when traveling over the ground, as at starting or after landing, and at no time is a single small wheel E called upon to take the whole load. Instead of employing separate spoke members B connected by rim or peripheral members C, disks or the like may be used, the wheels E being mounted at the peripheries of the disks in any appropriate manner.

What we claim and desire to secure by Letters Patent of the United States is:—

1. A vehicle wheel comprising a hub, spoke members radiating from the hub, a plurality of relatively small wheels each carried by a support mounted adjacent the outer ends of the spoke members, and rods or links connecting the spoke members adjacent the outer ends thereof.

2. A vehicle wheel comprising a hub, two sets of spokes radiating from the hub adjacent the ends thereof, rods or links connecting the spokes at each end of the hub adjacent the outer ends thereof, supports extending between and secured to alined spokes in the two sets, and relatively small wheels carried by said supports.

3. A vehicle wheel comprising spoke members at the outer parts of which are pivoted or articulated frames carrying a plurality of wheels, substantially as and for the purpose specified.

4. A vehicle wheel comprising a hub, spoke members radiating from the hub adjacent both ends thereof, a plurality of frames pivotally mounted between spoke members at opposite ends of the hub, relatively small wheels carried by said frames, and a spring connecting each of said frames with a member on the hub.

5. A vehicle wheel comprising a hub, supports extending radially from the hub, and a series of sets of relatively small wheels arranged between said supports and extending peripherally beyond them, each of said sets comprising a plurality of wheels.

COLIN MACBETH.
WALLACE HENRY PAULL.